(12) United States Patent
Kouchi

(10) Patent No.: US 8,682,538 B2
(45) Date of Patent: Mar. 25, 2014

(54) VEHICLE STEERING DEVICE

(75) Inventor: Tatsuma Kouchi, Kashiwara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/996,123

(22) PCT Filed: Dec. 21, 2011

(86) PCT No.: PCT/JP2011/079614
§ 371 (c)(1),
(2), (4) Date: Jun. 20, 2013

(87) PCT Pub. No.: WO2012/086677
PCT Pub. Date: Jun. 28, 2012

(65) Prior Publication Data
US 2013/0275010 A1    Oct. 17, 2013

(30) Foreign Application Priority Data
Dec. 21, 2010   (JP) ................................. 2010-284445

(51) Int. Cl.
*B60R 22/00* (2006.01)
(52) U.S. Cl.
USPC .......................................................... 701/49
(58) Field of Classification Search
None
See application file for complete search history.

(56) References Cited

U.S. PATENT DOCUMENTS

| | | | | |
|---|---|---|---|---|
| 8,298,023 | B2* | 10/2012 | Daikoku | 440/3 |
| 2008/0128197 | A1 | 6/2008 | Kawaguchi et al. | |
| 2010/0248561 | A1* | 9/2010 | Daikoku | 440/3 |
| 2011/0185839 | A1* | 8/2011 | Inoue | 74/493 |

FOREIGN PATENT DOCUMENTS

| | | |
|---|---|---|
| JP | A-63-265766 | 11/1988 |
| JP | A-5-229375 | 9/1993 |
| JP | A-2007-106179 | 4/2007 |
| JP | A-2008-137449 | 6/2008 |
| JP | A-2008-137450 | 6/2008 |
| JP | B2-4244947 | 3/2009 |

OTHER PUBLICATIONS

Apr. 3, 2012 International Search Report issued in International Patent Application No. PCT/JP2011/079614 (with translation).

* cited by examiner

*Primary Examiner* — Thomas Tarcza
*Assistant Examiner* — Adam Alharbi
(74) *Attorney, Agent, or Firm* — Oliff PLC

(57) ABSTRACT

A vehicle steering device performs a tilt operation of a steering shaft to a predetermined position by using a driving force of a motor, a steering wheel being mounted to an upper end of the steering shaft. The vehicle steering device includes: a tilt drive motor allows the steering shaft to move during the tilt operation; and a control unit which controls driving of the tilt drive motor. The control unit drives the tilt drive motor so as to determine a tilt displacement amount from an open loop transfer function of a mechanical system which takes inertia and viscosity of a steering column into consideration, based on a resultant force of torque of the tilt drive motor and steering torque, which is generated in the steering column in which the steering shaft is rotatably supported.

6 Claims, 3 Drawing Sheets

VEHICLE STEERING DEVICE

TECHNICAL FIELD

The present invention relates to a vehicle steering device. The invention relates more particularly to a vehicle steering device in which a steering wheel is moved to a tilt position (and a telescoped position) which are stored by driving a motor.

BACKGROUND ART

In the field of vehicle steering devices, vehicle steering devices have been proposed in recent years in which the position of a steering wheel, which is a steering member, can be automatically adjusted to an optimum position for each driver (for example, refer to Patent Documents 1 to 2).

In these vehicle steering devices, an optimum steering wheel position for the driver (a driver's position) is stored in advance, and the steering wheel is moved to the stored position by operating a selection switch on a control panel provided on a dashboard.

RELATED ART DOCUMENTS

Patent Documents

Patent Document 1: JP-A-63-265766
Patent Document 2: JP-A-5-229375

SUMMARY OF THE INVENTION

Problem to be Solved by the Invention

In the vehicle steering devices in which the position of the steering wheel can be controlled by driving the motor, an angle sensor is used to detect the tilt position, and the motor is controlled to be driven based on the results of the detection. However, since the angle sensor is expensive, the vehicle steering devices are adopted only in part of passenger vehicles in upper grades, and the vehicle steering devices have not yet been propagated to passenger vehicles in ordinary grades.

The invention has been made in view of these circumstances, and an object thereof is to provide a vehicle steering device in which a steering wheel can be moved to a desired tilt position without using such an angle sensor.

Means for Solving the Problem (1) According to an aspect of the invention, there is provided a vehicle steering device which performs a tilt operation of a steering shaft to a predetermined position by using a driving force of a motor, a steering wheel being mounted to an upper end of the steering shaft, the vehicle steering device including: a tilt drive motor allows the steering shaft to move during the tilt operation; and a control unit which controls driving of the tilt drive motor, wherein the control unit drives the tilt drive motor so as to determine a tilt displacement amount from an open loop transfer function of a mechanical system which takes inertia and viscosity of a steering column into consideration, based on a resultant force of torque of the tilt drive motor and steering torque, which is generated in the steering column in which the steering shaft is rotatably supported.

In the vehicle steering device set forth above, the tilt drive motor is controlled to be driven so that the tilt displacement amount is determined based on the resultant force of the torque of the tilt drive motor and the steering torque that is generated in the steering column by using the open loop transfer function of the mechanical system which takes the inertia and viscosity of the steering column into consideration. This makes it possible to control the tilt position without using the conventional expensive angle sensor.

(2) In the vehicle steering device according to (1), the control unit is preferably configured to tilt the steering column to a target position by adjusting an energizing time in a predetermined energizing pattern for energizing the tilt drive motor according to a tilt displacement amount $\theta$. As this occurs, by adjusting the energizing time for energizing the tilt drive motor the steering column can be moved to the target position.

(3) In the vehicle steering device according to (1) or (2), the control unit preferably drives the tilt drive motor so as to return the steering column to an initial position of the tilt operation when the steering torque exceeding a predetermined value is detected during the tilt operation. In performing the open loop control, when a large external force (steering torque) acts on the steering column, there may be fears that the position of the steering column after a control deviates from the stored optimum position. However, by returning the steering column to the initial position of the tilting thereof when a steering torque exceeding the predetermined value is detected while the steering column is being tilted, it is possible to prevent the occurrence of such a deviation. The open loop control can be performed again on the steering column that has been returned to the initial position to thereby move the steering column to the stored optimum tilt position.

(4) In the vehicle steering device according to (3), the vehicle steering device preferably includes a sensor which detects the return of the steering column to the initial position. As this occurs, it is possible to return the steering column to the predetermined initial position in an ensured fashion based on the detection by the sensor.

(5) In the vehicle steering device according to any one of (1) to (4), the vehicle steering device preferably includes a telescoping drive motor which allows telescoping of the steering column, and the control unit controls the driving of the telescoping drive motor and preferably drives the telescoping drive motor so as to determine a telescopic displacement amount from an open loop transfer function of a mechanical system which takes the inertia and viscosity of the steering column into consideration, based on a resultant force of torque of the telescoping drive motor and the steering torque, which is generated in the steering column. As this occurs, it is possible to move the steering wheel not only to the stored optimum tilt position but also to a stored optimum telescoped position.

(6) In the vehicle steering device according to any one of (1) to (5), a steering assist motor preferably functions as the tilt drive motor and the telescoping drive motor. As this occurs, the single motor can play three roles as the steering assist motor, the tilt drive motor and the telescoping drive motor to thereby reduce the number of parts involved in the vehicle steering device.

Advantages of the Invention

According to the vehicle steering device of the invention, it is possible to move the steering wheel to the desired tilt position without using any angle sensor.

MODE FOR CARRYING OUT THE INVENTION

Hereinafter, referring to the accompanying drawings, an embodiment of a vehicle steering device according to an embodiment of the invention will be described in detail.

Figure 1:
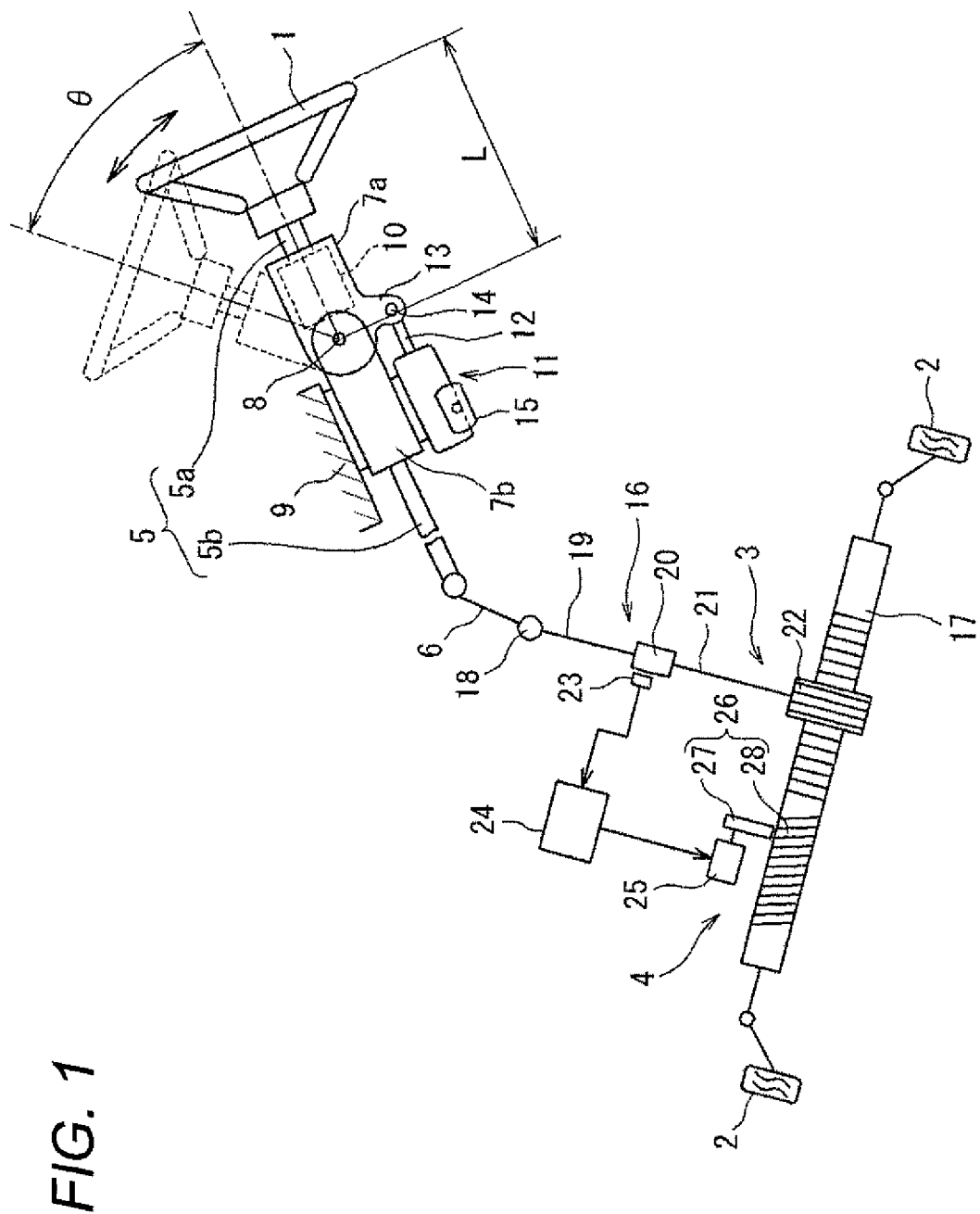
FIG. 1 is an explanatory diagram showing part of an embodiment of a vehicle steering device of the invention.

FIG. 1 is an explanatory diagram showing part of a vehicle steering device according to an embodiment of the invention. An electric power steering device, which is an example of an electric power steering device, includes a steering wheel 1 which is turned by the driver, a steering mechanism 3 which turns to steer steered wheels 2 in association with the turning of the steering wheel, a steering assist mechanism 4 which assists the driver in steering, and a steering shaft 5 and an intermediate shaft 6 which connect the steering wheel 1 and the steering mechanism 3 so as to transmit the rotation of the steering wheel 1 to the steering mechanism 3.

The steering shaft 5 includes an upper steering shaft 5a and a lower steering shaft 5b. The steering wheel 1 is connected to one end (an upper end) of the upper steering shaft 5a, and the lower steering shaft 5b is connected to the other end thereof via a telescoping drive portion 10 and a universal joint (not shown).

The upper steering shaft 5a is inserted through an interior of the telescoping drive portion 10 which is disposed in an interior of a tubular upper steering column 7a. The upper steering shaft 5a is connected to the telescoping drive portion 10 so that the upper steering shaft 5a can vertically extend or contract but cannot rotate relative thereto. On the other hand, this telescoping drive portion 10 is supported rotatably on the upper steering column 7a. Consequently, the upper steering shaft 5a is supported rotatably in the interior of the upper steering column 7a via the telescoping drive portion 10. The upper steering column 7a is attached to an upper end portion of a lower steering column 7b so as to rotate vertically via a rotational shaft 8. The lower steering column 7b is fixed to a chassis 9 of a vehicle.

The telescoping drive portion 10 includes a telescoping drive motor (not shown) and drives the upper steering shaft 5a so as to move back and forth along an axial direction by using, for example, a worm mechanism and a feed screw mechanism.

A tilt drive portion 11 is provided on the lower steering column 7b which causes the upper steering column 7a, that is, the steering wheel 1 to tilt. A rod 12 is provided in the tilt drive portion 11 so as to move back and forth in the axial direction, and a distal end portion of the rod 12 is attached to an arm portion 13 which is formed integrally on the upper steering column 7a via a pin 14 so as to move back and forth in the axial direction. The tilt drive portion 11 includes a tilt drive motor 15, and the rod 12 extends or contracts via the worm mechanism and the feed screw mechanism, which are not shown, by rotationally driving the tilt drive motor 15. When the rod 12 extends, the upper steering column 7a rotates upwardly as indicated by alternate long and short dash lines in FIG. 1, whereby the steering wheel 1 is moved to an uppermost withdrawal position. On the contrary, when the rod 12 contracts, the upper steering column 7a rotated downwardly, whereby the steering wheel 1 is moved to a position where the upper steering shaft 5a is substantially concentric with the upper steering column 7a as indicated by solid lines in FIG. 1.

The steering mechanism 3 includes a pinion shaft 16 which functions as an input shaft and a rack shaft 17 which functions as an output shaft. The intermediate shaft 6 is connected to the pinion shaft 16, and the rotation of the steering wheel 1 is transmitted to the pinion shaft 16 via the steering shaft 5 and the intermediate shaft 6. By dosing so, the pinion shaft 16 rotates. The rotation of the pinion shaft 16 is transformed into an axial motion of the rack shaft 17 by means of a meshing engagement of a pinion, which will be described later, with the rack shaft 17, as a result of which the steered wheels 2 connected to the rack shaft 17 are turned to be steered.

The pinion shaft 16 includes an input shaft 19 which is connected to the intermediate shaft 6 via a joint 18, an output shaft 21 which is connected to the input shaft 19 via a torsion bar 20, and a pinion 22 which is formed at an end portion (a lower end) of the output shaft 21. The input shaft 19 and the output shaft 21 are connected together via a torsion bar 22 so as to rotate relatively on the same straight line. By dosing so, when rotational torque on an axis of the input shaft 19 is inputted into the input shaft 19 by turning the steering wheel 1, the torsion bar 22 transmits the rotational torque to the output shaft 21 through the elastic torsional deformation thereof.

A torque sensor 23 is disposed on the periphery of the torsion bar 22, and this torque sensor 23 is made to detect steering torque inputted by the driver based on a relative rotational displacement amount between the input shaft 19 and the output shaft 21. Steering torque detected by the torque sensor 23 is inputted into an ECU (Electronic Control Unit) 24 which is equipped on the vehicle.

The steering assist mechanism 4 is such as to impart a steering assist force according to the steering torque to the steering mechanism 3 and includes a steering assist electric motor 25, a transmission mechanism 26 which transmits the power of the electric motor 25 to the rack shaft 13 of the steering mechanism 3. This transmission mechanism 26 includes a speed reduction mechanism 27 made up of a gear for transmitting the rotation of the electric motor 25 to the rack shaft 13 while reducing the speed thereof and a ball screw mechanism 28 as a transforming mechanism for transforming the rotation of the electric motor 25 transmitted from the speed reduction mechanism 27 to an axial motion of the rack shaft 13.

When the steering wheel 1 is turned by the driver, steering torque generated is detected by the torque sensor 23 which is disposed on the periphery of the torsion bar 20, and the steering torque detected is inputted into the ECU 24. This ECU 24 controls the electric motor 25 based on the detection result inputted and a vehicle speed that is inputted from a vehicle speed sensor, not shown. By doing so, power based on the steering torque and the vehicle speed is generated from the electric motor 25. The power so outputted is transmitted to the rack shaft 13 as a steering assist force by the speed reduction mechanism 27 and the ball screw mechanism 28 which make up the transmission mechanism 26, whereby the driver is assisted in turning the steering wheel 1.

The tilt drive motor 15, the telescoping drive motor and the steering assist electric motor 25 are connected to the ECU 24, and the driving of these motors is controlled by a control module of the ECU 24.

In the electric power steering device according to this embodiment, it is possible to control the position of the steering wheel 1 to an optimum position for the driver who drives the vehicle. This optimum position can be stored in a storage module of the ECU 24 in advance. The storage of the optimum position in the storage module can be implemented by a known method in which for example, a setting switch on a control panel (not shown) provided on a dashboard of the vehicle is operated when the steering wheel 1 is in a desired position.

The control of a tilt position of the steering wheel 1 is implemented by controlling the tilt drive motor 15 so that a tilt displacement amount is determined based on a resultant force of the torque of the tilt drive motor 15 and steering torque that is generated in the upper steering column 7a by using an open loop transfer function of a mechanical system which takes into consideration the inertia and viscosity of the steering column.

When attempting to displace a tilt drive side including the steering wheel 1 by a tilt displacement θ, the tilt drive side needs a force based on mg (g denoting gravitational acceleration) which is a total mass of the tilt drive side and an inertia J (tilt inertia) which corresponds to the shape of the tilt drive side over an overall length L of the tilt drive side.

Additionally, paying attention to a distal end portion (for example, the steering wheel) of the tilt drive side, it is considered that this distal end portion follows the rotation of a rotational shaft 7 which is a tilt drive shaft with a delay. In a common part like this, a characteristic in which a displacement speed v' of a different point is delayed relative to a displacement speed v of a certain point is called viscosity, and there exists a possibility that this viscosity acts on the tilt drive side with the rotational shaft 7 acting as an origin, and this is referred to as a tilt viscosity C.

Now, assuming that in the tilt drive motor 15, the motor voltage is V, the motor resistance is R, the motor current is I, the counter electromotive force coefficient is k, the motor rotational angular velocity is ω, the motor torque is Tm, the torque constant is G, the reduction ratio is n and a load (steering torque) applied on the tilt drive side is a T load, the following expressions (1) to (4) can be established, and in these four expressions, from the expression (3) which is an equation of motion, a different (n·Tm±T load) between the motor torque of the tilt drive motor 15 and the steering torque becomes a total of an inertia amount and a viscosity amount of the tile drive side (Jθ"+Cθ').

$$V = R \cdot I + k \cdot \omega \quad (1)$$

$$Tm = G \cdot I \quad (2)$$

$$n \cdot Tm \pm T\text{load} = J\theta'' + C\theta' \quad (3)$$

$$\omega = n \cdot \theta' \quad (4)$$

An equation θ=f(I) having the current I and the tilt angle θ of the tilt drive motor as variables can be induced from the expressions (1) to (4) above. When there exists no change in load applied to the tilt drive side, the tilt angle θ is determined uniquely relative to the current I of the tilt drive motor 15, and therefore, it is possible to move the position of the steering wheel 1 to a desired tilt position by performing an open loop control by using a preset current pattern.

Figure 3:
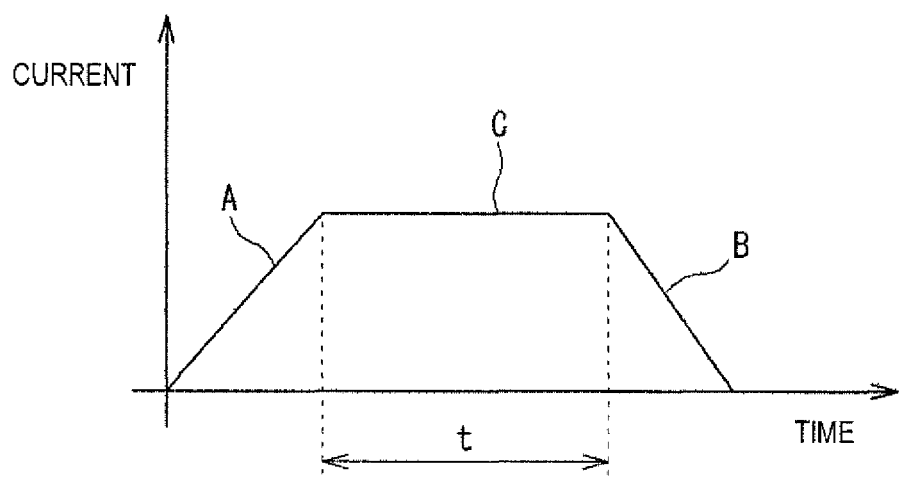
FIG. 3 is an explanatory diagram of an energizing pattern.

For example, a trapezoidal pattern shown in FIG. 3 can be used as the current pattern, and as this occurs, it is possible to change the tilt angle θ by changing a time t corresponding to a constant value portion C which excludes a current rising portion A and a current falling portion B. A sum of the rising portion A and the falling portion B is substantially constant, which is already known, as a matter of characteristics of electric current, and therefore, it is possible to change the tilt angle θ by setting an energizing time by taking this portion into consideration.

Assuming that the time differential of the tilt displacement amount θ is dθ/dt(=θ'), it becomes a mechanical displacement of the portion of Jθ"+Cθ' from the torque Tm which is necessary for the tilt drive motor 15 to drive the tilt drive side.

Assuming that the driver turns the steering wheel 1 here, steering torque (T load) is added to the inertia and viscosity of the tilt drive side. Here, since the steering torque T load is a load that acts temporarily, assuming that a target torque T' which the tilt drive motor 15 needs is Tm±T load, even though the steering torque acts, it is possible to generate only drive torque that is necessary for the steering wheel 1 to arrive at the target position that is stored in the storage module without attempting to generate unnecessary motor torque that includes the steering torque.

Here, in the preset energizing pattern, although the energizing time is determined according to the tilt angle θ as has been described above, by causing the tilt drive motor to be driven by adding a current value according to the target torque T' as a correction value for the constant current value in the energizing pattern, even in the event that a change in load of the tilt drive motor, that is, a change in steering torque occurs, it is possible to cause the steering column to arrive at the target tilt position within the determined energizing time.

However, in the event that the load changes largely, the position of the steering column after control deviates from the target position. Therefore, when a change in external force that exceeds a predetermined value occurs, it is preferable that the tilt control is interrupted and the steering column is moved to the initial position.

Figure 2:
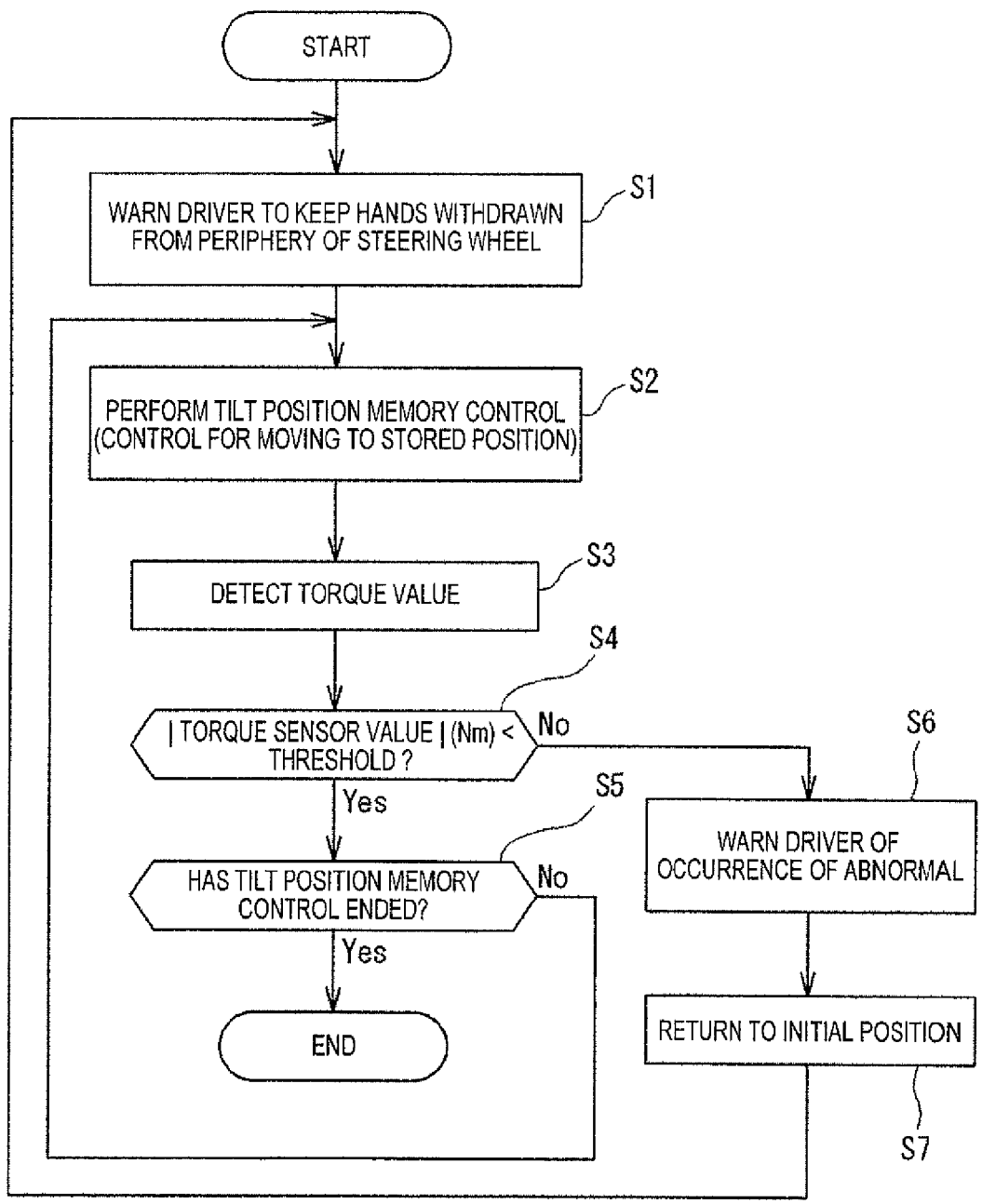
FIG. 2 is a flowchart of a tilt position control using the vehicle steering device of the embodiment of the invention.

FIG. 2 is a flowchart of the tilt position control which includes a move of the steering column to the initial position.

With a tilt control start switch operated by the driver, the control module of the ECU 24 issues to the driver a warning to keep his or her hands withdrawn from the periphery of the steering wheel 1 in step S1. This warning can be implemented by displaying the warning on a control panel provided on the dashboard or producing voice expressing loudly the warning.

Next, in step S2, a control is performed in which the upper steering column 5a is moved to the optimum tilt position for the driver that is stored in advance in the storage module of the ECU 24.

When the tilt control is started, the detection of steering torque is monitored at all times. Then, when torque is detected by the torque sensor 23 of the electric power steering device P (step S3), the control module determines whether or not an absolute value of the torque value detected is smaller than a predetermined threshold (step S4).

If the control module of the ECU 24 determines in step S4 that the absolute value of the torque value detected is smaller than the predetermined threshold (Yes), the control module causes the control process to proceed to step S5, where the control module determines whether or not the predetermined tilt position control has ended. If the control module determines in step S5 that the predetermined tilt position control has ended (Yes), the control module ends the control process. If the control module determines in step S5 that the predetermined tilt position control has not yet ended (No), the control module causes the control process to return to step S2, where a tilt position memory control continues.

On the other hand, if the control module determines in step S4 that the absolute value of the torque value detected is equal or larger than the predetermined threshold (No), the control module causes the control process to proceed to step S6, and in step S6, a warning that something abnormal has occurred is issued to the driver. As with the warning issued in step S1, this warning can be implemented by displaying the warning on the control panel provided on the dashboard or producing voice expressing loudly the warning.

Next, the control module of the ECU 24 drives the tilt drive motor 15 to return the upper steering column 5a to the predetermined initial position. As this occurs, it is preferable that a limit switch configured to come into contact or abutment with part of the upper steering column 5a when the upper steering column 5a has returned to the initial position or a proximity switch configured to detect the approach of the upper steering column 5a is provided in close proximity to the predetermined initial position.

When the steering column is returned to the initial position in step S7, the control process returns to step S1 where the tilt position memory control is repeated again, and therefore, it is possible to determine an accurate tilt angle.

(Other Modifications)

It should be noted that the invention is not limited to the embodiment that has been described heretofore and can be altered variously without departing from the scope of claims. For example, while the uppermost position of the upper steering column is referred to as its initial position in the embodiment, a lowermost position of the upper steering column may be referred to as its initial position.

Further, while the tilt drive motor, the telescoping drive motor and the steering assist motor are provided separately in the embodiment, it is possible to configure the steering assist motor so as to function as the tilt drive motor and the telescoping drive motor as well.

In addition, while the tilt position is controlled by using the open loop control in the embodiment, the telescoped position can also be controlled similarly by using the open loop control.

DESCRIPTION OF REFERENCE SIGNS

1: Steering Wheel; 2: Steered Wheel; 3: Steering Mechanism; 4: Steering Assist Mechanism; 5: Steering Shaft; 5a: Upper Steering Shaft; 5b: Lower Steering Shaft; 6: Intermediate Shaft; 7a: Upper Steering Column; 7b: Lower Steering Column; 8: Rotational Shaft; 9: Chassis; 10: Telescoping Drive Portion; 11: Tilt Drive Portion; 12: Rod; 13: Arm Portion; 14: Pin; 15: Tilt Drive Motor; 16: Pinion Shaft; 17: Rack Shaft; 18: Joint; 19: Input Shaft; 20: Torsion Bar; 21: Output Shaft; 22: Pinion; 23: Torque Sensor; 24: ECU; 25: Electric Motor; 26: Transmission Mechanism; 27: Speed Reduction Mechanism; 28: Ball Screw Mechanism.

The invention claimed is:

1. A vehicle steering device which performs a tilt operation of a steering shaft to a predetermined position by using a driving force of a motor, a steering wheel being mounted to an upper end of the steering shaft, said vehicle steering device comprising:
    a tilt drive motor allows the steering shaft to move during the tilt operation; and
    a control unit which controls driving of the tilt drive motor,
    wherein the control unit drives the tilt drive motor so as to determine a tilt displacement amount from an open loop transfer function of a mechanical system which takes inertia and viscosity of a steering column into consideration, based on a resultant force of torque of the tilt drive motor and steering torque, which is generated in the steering column in which the steering shaft is rotatably supported.

2. The vehicle steering device according to claim 1,
    wherein the control unit is configured to tilt the steering column to a target position by adjusting an energizing time in a predetermined energizing pattern for energizing the tilt drive motor according to a tilt displacement amount θ.

3. The vehicle steering device according to claim 1,
    wherein the control unit drives the tilt drive motor so as to return the steering column to an initial position of the tilt operation when the steering torque exceeding a predetermined value is detected during the tilt operation.

4. The vehicle steering device according to claim 3, further comprising a sensor which detects the return of the steering column to the initial position.

5. The vehicle steering device according to claim 1, further comprising a telescoping drive motor which allows telescoping of the steering column,
    wherein the control unit controls the driving of the telescoping drive motor and drives the telescoping drive motor so as to determine a telescopic displacement amount from an open loop transfer function of a mechanical system which takes the inertia and viscosity of the steering column into consideration, based on a resultant force of torque of the telescoping drive motor and the steering torque, which is generated in the steering column.

6. The vehicle steering device according to claim 5,
    wherein a steering assist motor functions as the tilt drive motor and the telescoping drive motor.

* * * * *